United States Patent [19]

Bayat

[11] Patent Number: 4,834,143

[45] Date of Patent: May 30, 1989

[54] SPRINKLER CONTROL SYSTEM

[76] Inventor: John J. Bayat, 3501 Cashill Blvd., Reno, Nev. 89509

[21] Appl. No.: 124,722

[22] Filed: Nov. 24, 1987

Related U.S. Application Data

[63] Continuation-in-part of Ser. No. 849,470, Apr. 8, 1986, Pat. No. 4,708,162.

[51] Int. Cl.$^4$ .............................................. A01G 25/16
[52] U.S. Cl. ................................. 137/899; 137/624.18; 137/382; 137/883; 239/69
[58] Field of Search ...................... 137/624.11, 624.18, 137/624.2, 899, 382, 883; 239/69, 70

[56]  References Cited

U.S. PATENT DOCUMENTS 2,637,469  5/1953  Clay ........................... 137/624.18 X
3,286,733 11/1966  Hunter ............................ 137/624.2
3,386,460  6/1918  Dean ............................ 137/624.18 X
4,548,225 10/1985  Busalacchi ................. 137/624.11 X Primary Examiner—Alan Cohan
Attorney, Agent, or Firm—Flehr, Hohbach, Test, Albritton & Herbert

[57]  ABSTRACT

Self-contained, automated flow control system for use in a water distribution system such as a sprinkler system. The system has a master valve which controls communication between a supply line and a manifold, and a plurality of control valves which control communication between the manifold and a plurality of outlet lines. An anti-siphon valve is connected between the master valve and the control valves to prevent water from being drawn back into the supply line from the outlet lines. Operation of the master valve and control valves is controlled by a clock timer which is programmed to actuate the valves in a predetermined sequence and to open the master valve only when one of the control valves is open.

7 Claims, 3 Drawing Sheets

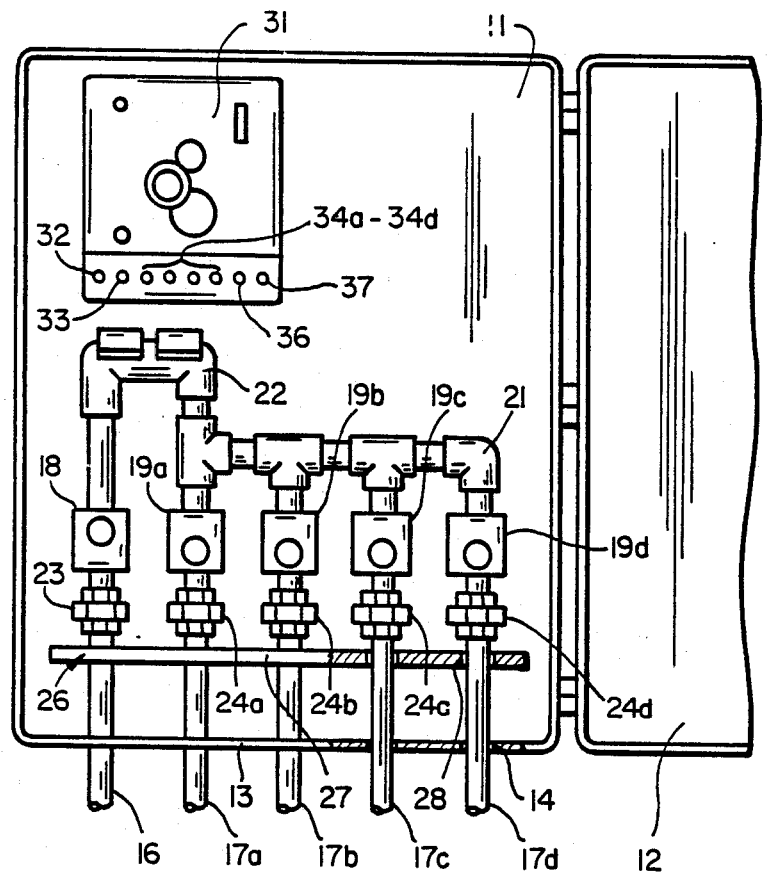
FIG_1
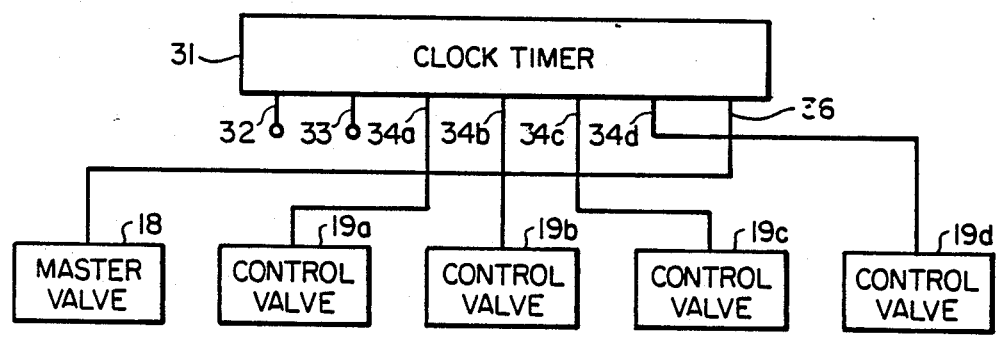
FIG_2

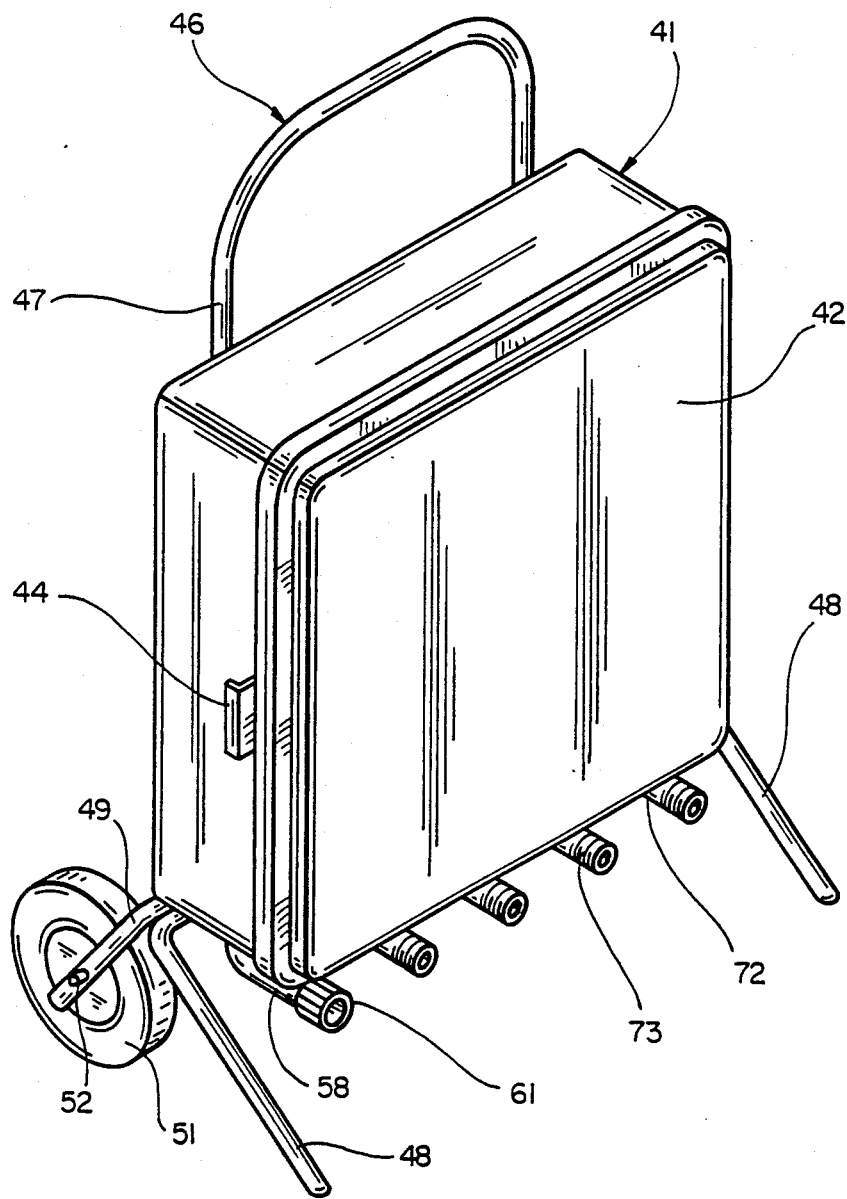
FIG_3

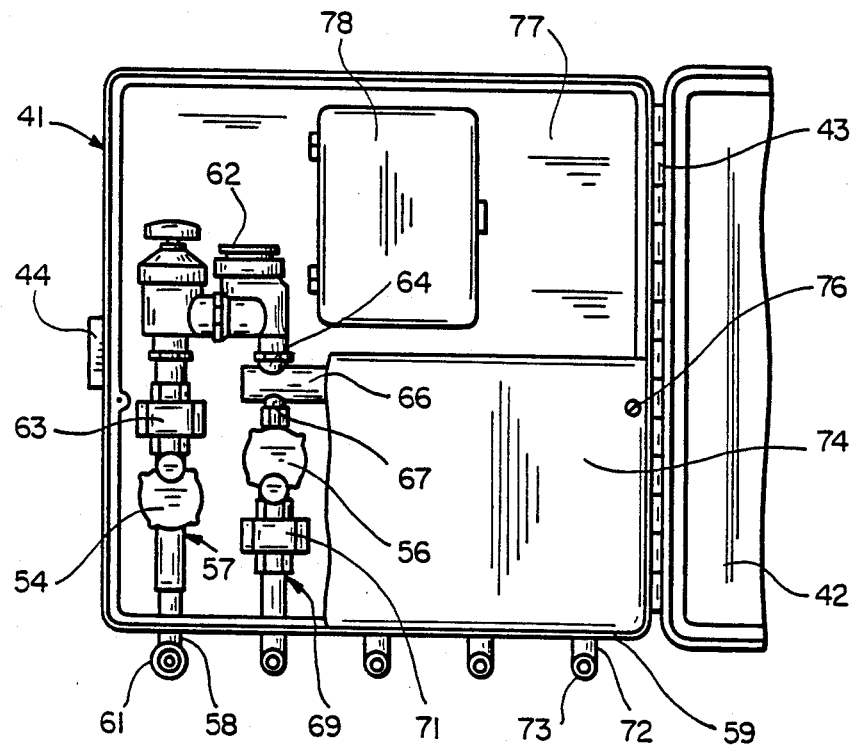
FIG_4

SPRINKLER CONTROL SYSTEM

This is a continuation-in-part of U.S. Ser. No. 849,470, filed Apr. 8, 1986, now U.S. Pat. No. 4,708,162.

This invention pertains generally to a water distribution systems such as sprinkler systems, and more particularly to an automated flow control system which is particularly suitable for use in a sprinkler system.

It is in general an object of the invention to provide a new and improved automated control system for sprinklers and other water distribution systems.

Another object of the invention is to provide a system of the above character which is economical to manufacture and easy to install and maintain.

These and other objects are achieved in accordance with the invention by providing a flow control system having a manifold, a master valve which controls communication between a supply line and the manifold, a plurality of control valves which control communication between the manifold and a plurality of outlet lines, an anti-siphon valve between the control valves and the master valve, and a clock timer for actuating the valves in a predetermined manner. The manner in which the valves are actuated is such that the master valve is open only when one of the control valves is open, and the pressure is removed from the anti-siphon valve when all of the control valves are closed. This system is constructed as a self-contained unit in a protective cabinet, and union connectors permit the supply and outlet lines to be readily connected to and disconnected from the unit.

FIG. 1 is a somewhat schematic front elevational view, partly broken away, of one embodiment of a flow control system according to the invention.

FIG. 2 is a circuit diagram of the flow control system of FIG. 1.

FIG. 3 is an isometric view of a second embodiment of a flow control system according to the invention.

FIG. 4 is a front elevational view, partly broken away, of a portion of the embodiment of FIG. 3 with the cabinet door in an open position.

As illustrated in FIG. 1, the flow control system includes a generally rectangular cabinet 11 having a hingedly mounted front cover 12. The bottom wall 13 of the cabinet has a plurality of circular openings 14 through which a supply line 16 and a plurality of outlet lines 17a–17d extend. Although a single supply line and four outlet lines are shown in this particular example, any desired number of lines can be employed, and the cabinet can be sized accordingly.

Within the cabinet, a master valve 18 and control valves 19a–19d control flow between the supply lines and the outlet lines. The master valve is connected between the supply line and the inlet port of a manifold 21, and the control valves are connected between the outlet ports of the manifold and the outlet lines. Each of these valves is an electrically actuated, normally closed, solenoid operated valve. An anti-siphon valve 22 is connected between the main valve and the inlet port of the manifold to prevent backflow from the outlet lines to the supply line.

Connections between the supply line and the master valve and between the outlet lines and the control valves are made with union fittings 23 and 24a–24d, respectively. These fittings permit the valves and manifold to be readily installed and removed without rotating or otherwise disturbing the supply and outlet lines.

The manifold and valves are secured in the cabinet by a mounting rack 26 which extends horizontally across the cabinet above bottom wall 13 and below unions 23 and 24a–24d. The rack comprises a bar 27 of rigid material which is affixed to the rear wall of the cabinet and has spaced apart openings 28 through which the supply and outlet lines extend. These openings are of smaller diameter than the unions, and the portions of the unions connected to the supply and outlet lines engage the rack to hold the lines when the manifold and valves are disconnected. The rack also permits limited up and down movement of the lines as they are connected and disconnected.

Operation of valves 18 and 19a–19d is controlled by a programmable clock timer 31 which is mounted in cabinet 11. This timer is of conventional design, and it has input terminals 32, 33 for connection to a power source, output terminals 34a–34d and 36, and a common or ground terminal 37. Terminals 34a–34d are energized sequentially in accordance with the programming of the timer, and terminal 36 is energized whenever one of the other output terminals is energized. Terminals 34a–34d are connected to control valves 19a–19d, respectively, and terminal 36 is connected to master valve 18. The master valve is energized or opened only when one of the control valves is open, and pressure is removed from the anti-siphon valve 22 when all of the control valves are closed.

Operation and use of the flow control system in connection with a sprinkler system is as follows. The control system is mounted in a suitable location such as the outside wall of a house or other building. Supply line 16 is connected to a pressurized water source, and outlet lines 17a–17d are connected to the feeders for the different sections of the sprinkler system. Input terminals 32, 33 of clock timer 31 are connected to a power source, and the timer is programmed to energize or open control valves 19a–19d in a predetermined sequence. Whenever one of the control valves is opened, the master valve is also opened, and water is delivered to the sprinkler section connected to that valve. Anti-siphon valve 22 prevents water from being drawn back into the supply line from the outlet lines, and pressure is removed from the anti-siphon valve when all of the control valves are closed.

The supply and outlet lines can be any suitable material, such as a plastic pipe or garden hose, and they can be provided with fittings for connection to other lines. Thus, for example, the supply line might be a pipe which is connected permanently to the water supply system, and the outlet lines might comprise pipe nipples with male hose fittings positioned outside the cabinet for connection to a plurality of hoses. Alternatively, the outlet lines might be pipes connected permanently to a sprinkler system. Any desired combination of hoses and pipes or other lines is possible.

The embodiment illustrated in FIGS. 3 and 4 is a portable unit which is particularly suitable for use with garden hoses. This embodiment includes a generally rectangular cabinet 41 with a front cover 42. The cover is mounted on the cabinet by a hinge 43 which extends along one side edge of the cabinet, with a latch 44 for securing the cover in its closed position.

Cabinet 41 is mounted on a hand cart 46 which has a U-shaped frame 47, with U-shaped legs 48, 49 extending forwardly and rearwardly from the lower end of the frame. Wheels 51 are rotatively mounted on an axle 52 which extends between the lower end portions of rear legs 49. In the embodiment illustrated, the frame and legs are each fabricated of a rigid tubular material, and the central sections of the U-shaped legs are affixed to the lower portions of the frame by suitable means such as welding. The cabinet can be secured to the frame by any suitable means such as screws or clamps (not shown). The lengths of the legs are such that the frame and cabinet are maintained in an upright position when wheels 51 and the lower ends of front legs 48 are resting on a level surface.

A master valve 54 and a plurality of control valves 56 are mounted within cabinet 41. These valves are electrically actuated, normally closed, solenoid operated valves similar to valves 18 and 19a–19d in the embodiment of FIG. 1. A supply line 57 is connected to the inlet side of master valve 54. The supply line includes an elbow 58 which extends through an opening in the bottom wall 59 and has a female hose fitting 61 at the lower or front end thereof.

The outlet side of master valve 54 is connected to the inlet of an anti-siphon valve 62 by a union fitting 63. As in the embodiment of FIG. 1, the anti-siphon valve prevents backflow from the system into the supply line.

The outlet of anti-siphon valve 62 is connected to the inlet port 64 of a manifold 66. The manifold has a horizontally extending tubular body and a plurality of outlet ports 67 which are connected to the inlet sides of control valves 56. In this embodiment, manifold 66 is preferably fabricated as a unitary structure by injection molding.

The outlet sides of control valves 56 are connected to outlet lines 69 by union fittings 71. The outlet lines include elbows 72 which pass through openings in the bottom wall 59 of the housing, with male hose fittings 73 at the outer ends of the elbows.

Master valve 54, control valves 56, and manifold 66 are mounted in the lower portion of housing 41 and covered by a removable panel 74. This panel is secured to the housing by mounting screws 76 and has a horizontally extending upper wall or flange with rearwardly facing openings (not shown) through which the inlet and outlet fittings of the anti-siphon valve can pass during installation and removal of the panel. Manifold 66 is secured to the rear wall 77 of the housing by suitable means such as clamps and screws (not shown).

A programmable clock timer 78 similar to clock timer 31 is mounted in the upper portion of the housing. This clock timer is connected to valves 54, 56 in the same manner that clock timer 31 is connected to valves 18, 19a–19d and the electrical connections are omitted from the drawings for ease of illustration.

Operation and use of the embodiment of FIGS. 3-4 is as follows. The system is rolled to a desired location on wheels 51 and stood in an upright position, as illustrated. The unit is relatively light in weight, and if desired, it can be lifted and carried about.

A supply hose is connected to the female hose fitting 61 on the supply line, and garden hoses can be connected to the male hose fittings 73 on the outlet lines. As in the embodiment of FIG. 1, whenever one of the control valves is open, the master valve is also open, and water is delivered to the hose connected to that valve. Anti-siphon valve 62 prevents water from being drawn back into the supply line from the outlet lines, and pressure is removed from the anti-siphon valve when all of the control valves are closed.

If desired, anti-siphon valve 62, manifold 66 and control valves 56 can be removed from the cabinet as a unit by disconnecting union fittings 63, 71 with master valve 54 in its closed position. With the master valve positioned upstream of union 63 in the supply line, there is no need to turn off the water supply to the master valve.

The invention has a number of important features and advantages. It is constructed as a self-contained unit which is economical to manufacture and easy to install and maintain. It can be employed in a wide variety of applications.

It is apparent from the foregoing that a new and improved flow control system has been provided. While only one presently preferred embodiment has been described in detail, as will be apparent to those familiar with the art, certain changes and modifications can be made without departing from the scope of the invention as defined by the following claims.

I claim:

1. In a sprinkler control system: a cart having a generally upright frame with ground engaging wheels and legs toward the lower end thereof, a cabinet mounted on the frame and supported in an upright position when the ground engaging wheels and legs are resting on a level surface, a supply line having a female hose fitting at its outer end passing through an opening in the cabinet, a plurality of outlet lines having male hose fittings at the outer ends thereof passing through openings in the cabinet, a manifold mounted within the cabinet having an inlet port and a plurality of outlet ports, a master valve and an anti-siphon valve connected between the supply line and the inlet port of the manifold, and control valves connected between the outlet ports of the manifold and the inner ends of the outlet lines.

2. The system of claim 1 including union fittings connected between the master valve and the anti-siphon valve and between the control valves and the outlet line to permit the anti-siphon valve, the manifold and the control valves to be disconnected from the supply and outlet lines without rotation of the lines.

3. The system of claim 1 including a clock timer within the cabinet connected to the master valve and to the control valves for selectively opening the master valve and the control valves with the master valve being open only when one of the control valves is open.

4. The system of claim 1 wherein the cabinet is generally rectangular and the supply line and the outlet lines pass through the bottom wall of the cabinet.

5. The system of claim 4 wherein the supply line and the outlet lines extend in a horizontal direction beneath the bottom wall of the cabinet.

6. In a sprinkler control system: a cart with wheels, a cabinet mounted in a generally upright position on the cart, a supply line and a plurality of outlet lines passing through openings in the cabinet, a manifold within the cabinet having an inlet port and a plurality of outlet ports, an anti-siphon valve connected to the inlet port of the manifold, a master valve and a union fitting connected between the supply line and the inlet of the anti-siphon valve, control valves connected to the outlet ports of the manifold, and union fittings connecting the outlets of the control valves to the outlet lines.

7. The system of claim 6 wherein the hand cart comprises a generally U-shaped upright frame having a first pair of legs extending rearwardly therefrom and a second pair of legs extending forwardly therefrom, with the wheels being rotatively mounted on the rearwardly extending legs and the forwardly extending legs being of sufficient length to engage the ground and support the cabinet in the generally upright position.

* * * * *